US012592570B2

(12) United States Patent (10) Patent No.: US 12,592,570 B2
Mouri et al. (45) Date of Patent: Mar. 31, 2026

(54) ELECTRONIC DEVICE

(71) Applicant: Panasonic Intellectual Property Management Co., Ltd., Osaka (JP)

(72) Inventors: Masaaki Mouri, Nara (JP); Yuri Nishizumi, Tokyo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 272 days.

(21) Appl. No.: 18/379,366

(22) Filed: Oct. 12, 2023

(65) Prior Publication Data

US 2024/0039297 A1 Feb. 1, 2024

Related U.S. Application Data

(63) Continuation of application No. PCT/JP2022/014791, filed on Mar. 28, 2022.

(30) Foreign Application Priority Data

Apr. 21, 2021 (JP) ................................. 2021-071756

(51) Int. Cl.
H02J 5/00 (2016.01)
H02J 7/00 (2006.01)
H02J 50/80 (2016.01)
(52) U.S. Cl.
CPC ............ H02J 5/00 (2013.01); H02J 7/00712 (2020.01); H02J 50/80 (2016.02); *H02J 7/00714* (2020.01)
(58) Field of Classification Search
CPC .......... H02J 5/00; H02J 50/80; H02J 7/00712; H02J 7/00714; H02J 1/084; H02J 1/12; G06F 1/263

(Continued)

(56) References Cited

U.S. PATENT DOCUMENTS 7,560,898 B1 * 7/2009 Kranzen ................. H02M 1/10
323/282
2003/0139823 A1 7/2003 Ando et al.
(Continued)

FOREIGN PATENT DOCUMENTS

JP H10-225004 A 8/1998
JP 2003-216287 A 7/2003
(Continued)

OTHER PUBLICATIONS

The EPC Office Action dated Sep. 13, 2024 for the related European Patent Application No. 22791490.0.
(Continued)

*Primary Examiner* — Thienvu V Tran
*Assistant Examiner* — Lauren Ashley Shaw
(74) *Attorney, Agent, or Firm* — Renner, Otto, Boisselle & Sklar, LLP

(57) ABSTRACT

An electronic device includes a first switching circuit switching a power feed path between a first path for supplying first power and a second path for supplying second power, and a step-up/down circuit changing a voltage of the second power. The first switching circuit switches the power feed path to the first path when a voltage of the first path is higher than a voltage of the second path, and switches the power feed path to the second path when a voltage of the second path is higher than a voltage of the first path. The step-up/down circuit makes the voltage of the second power lower than a voltage of the first power when the first power is larger than the second power, and makes the voltage of the second power higher than the voltage of the first power when the second power is larger than the first power.

7 Claims, 4 Drawing Sheets

(58) Field of Classification Search
USPC ............................................................. 363/34
See application file for complete search history.

(56) References Cited

U.S. PATENT DOCUMENTS

2009/0127935 A1 * 5/2009 Hung ..................... H02J 7/0031
                                                          307/43
2016/0126754 A1    5/2016 Ichikawa et al.
2019/0372376 A1 * 12/2019 Kwak ................... H01R 31/065

FOREIGN PATENT DOCUMENTS

JP          2006-140602  A        6/2006
JP            2015023766  A    *  2/2015
JP          2018-063558  A        4/2018
JP          2020-080614  A        5/2020
WO          2015/186581  A1     12/2015

OTHER PUBLICATIONS

International Search Report for related Application No. PCT/JP2022/014791, mailed Jun. 28, 2022.

* cited by examiner

ELECTRONIC DEVICE

BACKGROUND

1. Technical Field

The present disclosure relates to an electronic device.

2. Description of the Related Art

Patent Literature (PTL) 1 discloses a power supply control circuit that reduces a decrease in performance of a system that is a power supply target.

PTL 1 is Unexamined Japanese Patent Publication No. 2018-063558.

SUMMARY

The power supply control circuit of PTL 1 has room for improvement in preventing a decrease in performance when a plurality of power is simultaneously supplied via a plurality of power feed paths.

An object of the present disclosure is to provide an electronic device capable of preventing a decrease in performance when a plurality of power is simultaneously supplied via a plurality of power feed paths.

An electronic device of one aspect of the present disclosure includes: a first power feed port to which a first power supply adapter is connected; a second power feed port to which a second power supply adapter is connected; a first switching circuit that switches a power feed path between a first path that is connected to the first power feed port and supplies first power to a power feed target and a second path that is connected to the second power feed port and supplies second power to the power feed target; a step-up/down circuit that is arranged between the second power feed port and the first switching circuit in the second path and raises or lowers a voltage of the second power; and a control device that controls the step-up/down circuit, in which the first switching circuit switches the power feed path to the first path when a voltage of the first path is higher than a voltage of the second path, and switches the power feed path to the second path when a voltage of the second path is higher than a voltage of the first path, and the control device compares the first power and the second power when the first power supply adapter is connected to the first power feed port and the second power supply adapter is connected to the second power feed port, causes the step-up/down circuit to make the voltage of the second power lower than the voltage of the first power when the first power is larger than the second power, and causes the step-up/down circuit to make the voltage of the second power higher than the voltage of the first power when the second power is larger than the first power.

According to the present disclosure, it is possible to achieve an electronic device capable of preventing a decrease in performance when a plurality of power is simultaneously supplied via a plurality of power feed paths.

DETAILED DESCRIPTION

Background of Present Disclosure

Figure 1:
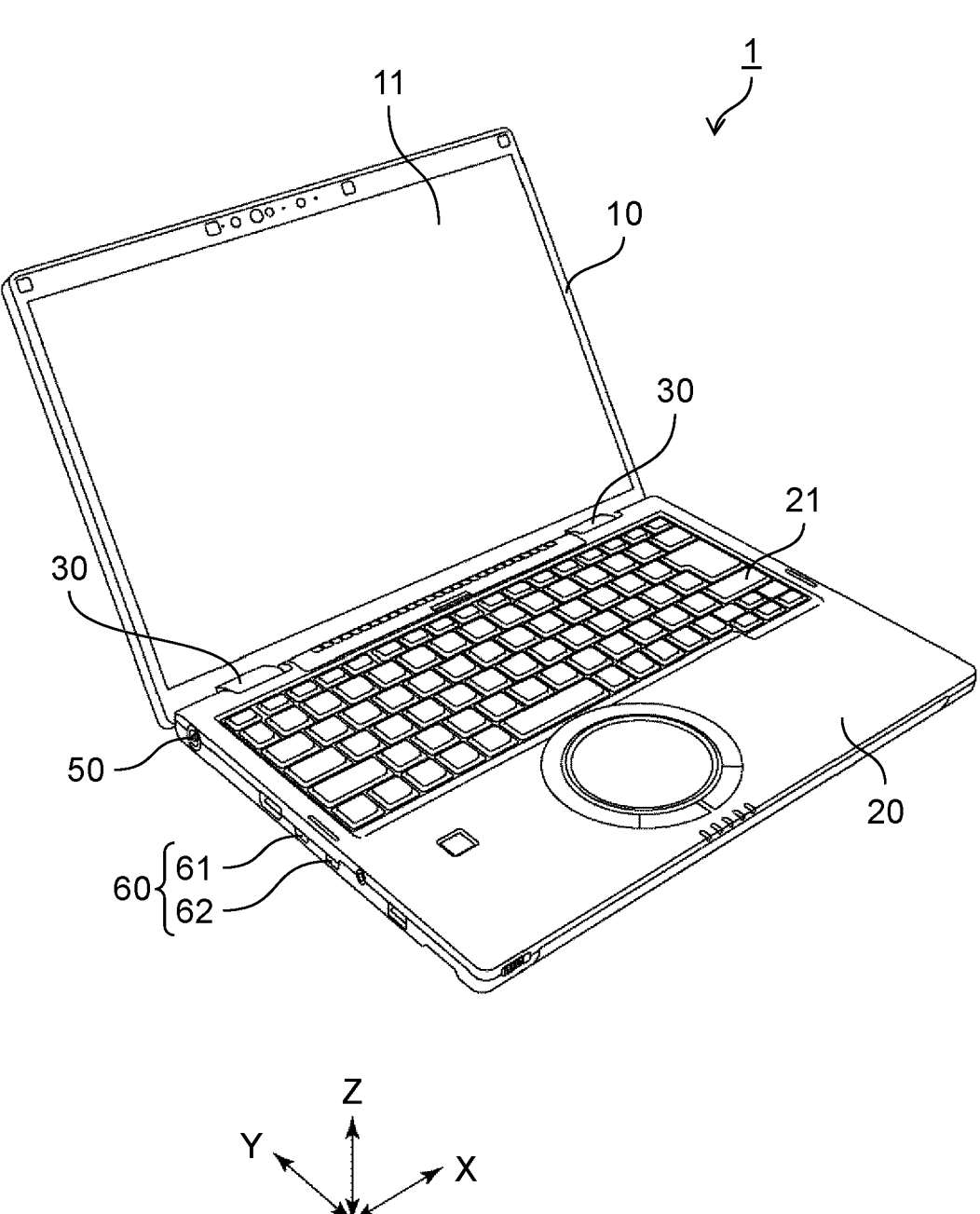
FIG. 1 is a perspective view illustrating an electronic device of one exemplary embodiment of the present disclosure.

The power supply control circuit of PTL 1 assumes that a maximum supply power of a USB-PD adapter is 60 W, and when an AC adapter is connected, a power supply path of the USB-PD adapter is disconnected to reduce an output voltage to be less than an output voltage of the AC adapter.

In recent years, adapters compatible with USB-PD standards with a supply power of 100 W and a supply voltage of 20 V have been rapidly spreading. For example, it is assumed that an AC adapter having a supply power of 85 W and a supply voltage of 16 V and a USB-PD adapter having a supply power of 100 W and a supply voltage of 20 V are connected to a personal computer including the power supply control circuit of PTL 1. In this case, in the power supply control circuit of PTL 1, not a USB-PD adapter with large supply power but an AC adapter with small supply power is selected. This results in an increase in the charging time of the battery, and the performance of the electronic device may decrease, such as a decrease in the operation clock of the CPU.

The present inventors have devised an electronic device capable of preventing a decrease in performance by more reliably performing switching to a power feed path having a large supply power when a plurality of power is simultaneously supplied via a plurality of power feed paths, and have reached the following invention.

An electronic device of a first aspect of the present disclosure includes: a first power feed port to which a first power supply adapter is connected; a second power feed port to which a second power supply adapter is connected; a first switching circuit that switches a power feed path between a first path that is connected to the first power feed port and supplies first power to a power feed target and a second path that is connected to the second power feed port and supplies second power to the power feed target; a step-up/down circuit that is arranged between the second power feed port and the first switching circuit in the second path and raises or lowers a voltage of the second power; and a control device that controls the step-up/down circuit, in which the first switching circuit switches the power feed path to the first path when a voltage of the first path is higher than a voltage of the second path, and switches the power feed path to the second path when a voltage of the second path is higher than a voltage of the first path, and the control device compares the first power and the second power when the first power supply adapter is connected to the first power feed port and the second power supply adapter is connected to the second power feed port, causes the step-up/down circuit to make the voltage of the second power lower than the voltage of the first power when the first power is larger than the second power, and causes the step-up/down circuit to make the voltage of the second power higher than the voltage of the first power when the second power is larger than the first power.

According to the electronic device of the first aspect, it is possible to achieve an electronic device capable of preventing a decrease in performance by more reliably performing switching to a power feed path having a large supply power when a plurality of power is simultaneously supplied via a plurality of power feed paths.

An electronic device according to a second aspect of the present disclosure further includes a second switching circuit, in which the second power feed port includes a third power feed port to which a third power supply adapter is connected and a fourth power feed port to which a fourth power supply adapter is connected, the second switching circuit switches the power feed path between a third path that is connected to the third power feed port and supplies third power to the power feed target and a fourth path that is connected to the fourth power feed port and supplies fourth power to the power feed target, and the control device compares the third power and the fourth power when the third power supply adapter is connected to the third power feed port and the fourth power supply adapter is connected to the fourth power feed port, causes the second switching circuit to switch the power feed path to the third path and the third path to constitute the second path when the third power is larger than the fourth power, and causes the second switching circuit to switch the power feed path to the fourth path, and the fourth path to constitute the second path when the fourth power is larger than the third power.

According to the electronic device of the second aspect, it is possible to achieve an electronic device capable of preventing a decrease in performance even when a plurality of power is simultaneously supplied via three or more power feed paths.

In an electronic device of a third aspect of the present disclosure, the control device determines whether or not the power feed path can be switched by the second switching circuit based on a state of the power feed target when the third power supply adapter is connected to the third power feed port and the fourth power supply adapter is connected to the fourth power feed port.

According to the electronic device of the third aspect, it is possible to avoid unintended power discontinuity of the electronic device that can occur when a power feed path is switched under a condition where a load of a power feed target is large, for example.

In an electronic device of a fourth aspect of the present disclosure, the power feed target includes a battery, and the control device determines whether or not the power feed path can be switched by the second switching circuit depending on presence or absence and a remaining amount of the battery.

According to the electronic device of the fourth aspect, it is possible to more reliably avoid unintended power discontinuity of the electronic device that can occur when a power feed path is switched under a condition where a load of a power feed target is large, for example.

In an electronic device of a fifth aspect of the present disclosure, the power feed target includes a processing device, and the control device causes the second switching circuit to switch the power feed path after the control device temporarily decreases performance of the processing device, when the control device determines that the power feed path can be switched by the second switching circuit.

According to the electronic device of the fifth aspect, it is possible to more reliably avoid unintended power discontinuity of the electronic device that can occur when a power feed path is switched under a condition where a load of a power feed target is large.

In an electronic device of a sixth aspect of the present disclosure, after temporarily decreasing performance of the processing device, before switching the power feed path, the control device causes the second switching circuit to turn off the third path and the fourth path.

According to the electronic device of the sixth aspect, it is possible to prevent a short circuit between the third power supply adapter and the fourth power supply adapter due to simultaneous turning-on of the plurality of power feed paths.

In an electronic device of a seventh aspect of the present disclosure, the control device includes a first control device that acquires information on the third power and the fourth power from the third power feed port and the fourth power feed port, and a second control device that controls the step-up/down circuit and controls the second switching circuit based on the information acquired by the first control device.

According to the electronic device of the seventh aspect, it is possible to achieve an electronic device capable of more reliably preventing a decrease in performance even when a plurality of power is simultaneously supplied via three or more power feed paths.

Hereinafter, an exemplary embodiment of the present disclosure will be described with reference to the drawings. The drawings illustrate the same components that are denoted by the same reference marks, and that will not be described as appropriate. The exemplary embodiment does not limit the present disclosure but is an example, and thus can be appropriately changed in a scope without departing from the gist of the present disclosure.

Examples of electronic device 1 of the present exemplary embodiment include a laptop personal computer (in other words, a notebook PC) as illustrated of FIG. 1. Electronic device 1 includes first unit 10 and second unit 20. First unit 10 is rotatably attached to second unit 20 through a pair of hinges 30.

First unit 10 includes display 11. Display 11 includes a liquid crystal display panel having a substantially rectangular shape, for example.

Second unit 20 includes inputter 21 including a keyboard and a touch pad, first power feed port 50, and second power feed port 60, and is configured such that a user can perform input processing via inputter 21. In the present exemplary embodiment, second unit 20 includes two second power feed ports 60. Second unit 20 incorporates a central processing unit (CPU), a volatile storage device (RAM), a nonvolatile storage device (ROM, SSD, or the like), a battery, and the like. The nonvolatile storage device (ROM, SSD, or the like) stores an operating system (OS), various application programs, various data, and the like. The central processing unit (CPU) implements various functions by reading the OS, the application programs, and the various data to execute arithmetic processing.

For example, a legacy AC adapter (hereinafter, called AC adapter) having a supply power of 65 W and a supply voltage of 16 V is connected to first power feed port 50. The AC adapter is connected to a commercial power supply via a household outlet or the like, and receives power supply.

For example, a USB power delivery (USB-PD) adapter having a supply power of less than or equal to 100 W and a supply voltage of 5 to 20 V is connected to second power feed port 60. In the present exemplary embodiment, second power feed port 60 includes a plurality of power feed ports (third power feed port 61 and fourth power feed port 62). An arbitrary USB-PD adapter is connected to third power feed port 61 and fourth power feed port 62. That is, the third power supply adapter 64 connected to third power feed port 61 and the fourth power supply adapter 65 connected to fourth power feed port 62 may have the same supply power and different supply voltages, or may have different supply power but the same supply voltage.

The first power supplied to electronic device 1 via first power feed port 50 or the second power supplied to electronic device 1 via second power feed port 60 is supplied to power feed target 100. Power feed target 100 is, for example, a system that operates electronic device 1, and includes a processing device (CPU) and a battery.

The pair of hinges 30 can hold first unit 10 at any angle with respect to second unit 20 by rotating first unit 10 with respect to second unit 20 about a rotation shaft extending along a width direction (e.g., X direction) of electronic device 1. For example, as illustrated in FIG. 1, electronic device 1 can hold first unit 10 in an opened state forming any angle (e.g., approximately 120 degrees illustrated in FIG. 1) with respect to second unit 20 by the pair of hinges 30. In electronic device 1, first unit 10 can be held in a closed state forming an angle of substantially 0 degrees with respect to second unit 20 by the pair of hinges 30. The closed state is a state where first unit 10 and second unit 20 face each other in proximity and are substantially parallel to each other.

Figure 2:
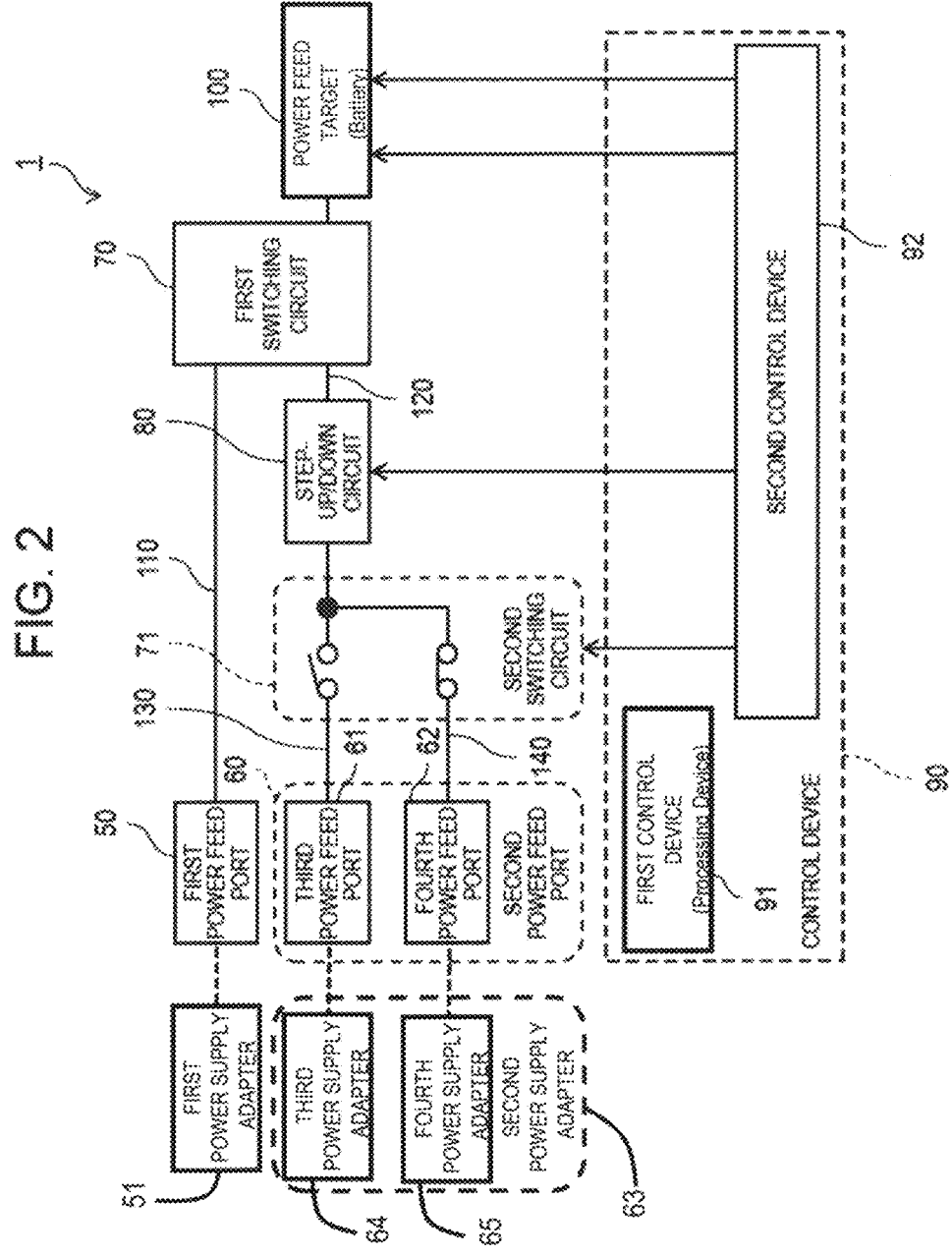
FIG. 2 is a block diagram illustrating the electronic device of FIG. 1.

As illustrated in FIG. 2, electronic device 1 includes first switching circuit 70, second switching circuit 71, step-up/down circuit 80, and control device 90. Control device 90 controls second switching circuit 71 and step-up/down circuit 80.

First switching circuit 70 includes, for example, a diode OR circuit, and switches the power feed path between first path 110, which is connected to first power feed port 50 and supplies the first power to power feed target 100, and second path 120, which is connected to second power feed port 60 and supplies the second power to power feed target 100. Specifically, first switching circuit 70 switches the power feed path to first path 110 when the voltage of first path 110 is higher than the voltage of second path 120, and switches the power feed path to second path 120 when the voltage of second path 120 is higher than the voltage of first path 110. In the present exemplary embodiment, the power feed path between first switching circuit 70 and power feed target 100 constitutes a part of first path 110 and constitutes a part of second path 120.

Second switching circuit 71 switches the power feed path between third path 130, which is connected to third power feed port 61 and supplies the third power to power feed target 100, and fourth path 140, which is connected to fourth power feed port 62 and supplies the fourth power to power feed target 100. In the present exemplary embodiment, the power feed path between second switching circuit 71 and power feed target 100 constitutes a part of third path 130 and constitutes a part of fourth path 140.

Step-up/down circuit 80 is arranged between second power feed port 60 and first switching circuit 70 in second path 120, and raises or lowers the voltage of the second power. In the present exemplary embodiment, step-up/down circuit 80 is arranged between first switching circuit 70 and second switching circuit 71 in second path 120.

As an example, control device 90 includes first control device 91 and second control device 92. First control device 91 is, for example, a USB-PD controller, and second control device 92 is, for example, an embedded controller (EC). Second control device 92 is positioned higher in the system than first control device 91.

Each of first control device 91 and second control device 92 includes, for example, a processing device (CPU) and a storage device (RAM, ROM, or SSD). The nonvolatile storage device stores an operating system (OS), various application programs, various data, and the like. The processing device implements various functions by reading the OS, the application programs, and the various data to execute arithmetic processing.

First control device 91 acquires information on the third power and the fourth power from third power feed port 61 and fourth power feed port 62. When the third power supply adapter 64 is connected to third power feed port 61 or the fourth power supply adapter 65 is connected to fourth power feed port 62, first control device 91 executes negotiation with the third power supply adapter 64 or the fourth power supply adapter 65 in accordance with the USB-PD standard. Through this negotiation, information on the third power and the fourth power is acquired.

Second control device 92 controls step-up/down circuit 80 and controls second switching circuit 71 based on the information acquired by first control device 91.

Specifically, when the first power supply adapter 51 is connected to first power feed port 50 and the second power supply adapter 63 is connected to second power feed port 60, second control device 92 compares the first power and the second power. When the first power is larger than the second power, second control device 92 causes step-up/down circuit 80 to lower the voltage of the second power to be lower than the voltage of the first power. Due to this, the power feed path is switched to first path 110, and the first power is supplied to power feed target 100. When the second power is larger than the first power, second control device 92 causes step-up/down circuit 80 to raise the voltage of the second power to be higher than the voltage of the first power. Due to this, the power feed path is switched to second path 120, and the second power is supplied to power feed target 100. In the present exemplary embodiment, the first power that is the supply power of the AC adapter is acquired in advance and stored in a storage device of second control device 92.

For example, when the power supply adapter is connected to neither third power feed port 61 nor fourth power feed port 62, second control device 92 determines that the second power supply adapter 63 is not connected to second power feed port 60.

For example, when the third power supply adapter 64 is connected to third power feed port 61 but the fourth power supply adapter 65 is not connected to fourth power feed port 62, second control device 92 determines that third power feed port 61 is second power feed port 60 and the third power supply adapter 64 is the second power supply adapter 63.

For example, when the third power supply adapter 64 is connected to third power feed port 61 and the fourth power supply adapter 65 is connected to fourth power feed port 62, second control device 92 compares the third power and the fourth power. When the third power is larger than the fourth power, second control device 92 causes second switching circuit 71 to switch the power feed path to third path 130. In this case, third path 130 constitutes second path 120, and second control device 92 determines that third power feed port 61 is second power feed port 60 and the third power supply adapter 64 is the second power supply adapter 63. When the fourth power is larger than the third power, second control device 92 causes second switching circuit 71 to switch the power feed path to fourth path 140. In this case, fourth path 140 constitutes second path 120, and second control device 92 determines that fourth power feed port 62 is second power feed port 60 and the fourth power supply adapter 65 is the second power supply adapter 63.

Before switching the power feed path between third path 130 and fourth path 140, second control device 92 determines whether or not the power feed path can be switched by second switching circuit 71 based on the state of power feed target 100. The state of power feed target 100 refers to a state of power feed target 100 where a failure such as power discontinuity does not occur when the power feed path is switched.

For example, when power feed target 100 includes a battery, second control device 92 determines whether or not the power feed path can be switched by second switching circuit 71 depending on the presence or absence of the battery and a remaining amount of the battery. As an example, when the remaining amount of the battery is more than or equal to 10%, second control device 92 determines that the power feed path can be switched by second switching circuit 71. When the remaining amount of the battery is less than 10%, second control device 92 regards that the remaining amount of the battery is 0%.

For example, when power feed target 100 includes the processing device (CPU), second control device 92 determines that the power feed path can be switched by second switching circuit 71 when a Prochot signal (signal for suppressing the clock frequency of the CPU to 0.2 GHz) is asserted.

When it is determined that the power feed path can be switched by second switching circuit 71, second control device 92 temporarily decreases the CPU performance, turns off third path 130 and fourth path 140, and then controls second switching circuit 71 to switch the power feed path. Decrease and increase in the CPU performance are performed, for example, in Power limit 4 (PL4).

In the present exemplary embodiment, when the power supply adapter is connected to the respective power feed port or when the power supply adapter is removed from the respective power feed port, a signal is output from the respective power feed port to control device 90. First control device 91 and second control device 92 determine whether or not the power supply adapter is connected to the respective power feed port based on a signal output from the respective power feed port.

Next, power feed processing to power feed target 100 when the USB-PD adapter is connected to second power feed port 60 in a state where the AC adapter is connected to first power feed port 50 will be described.

Figure 3:
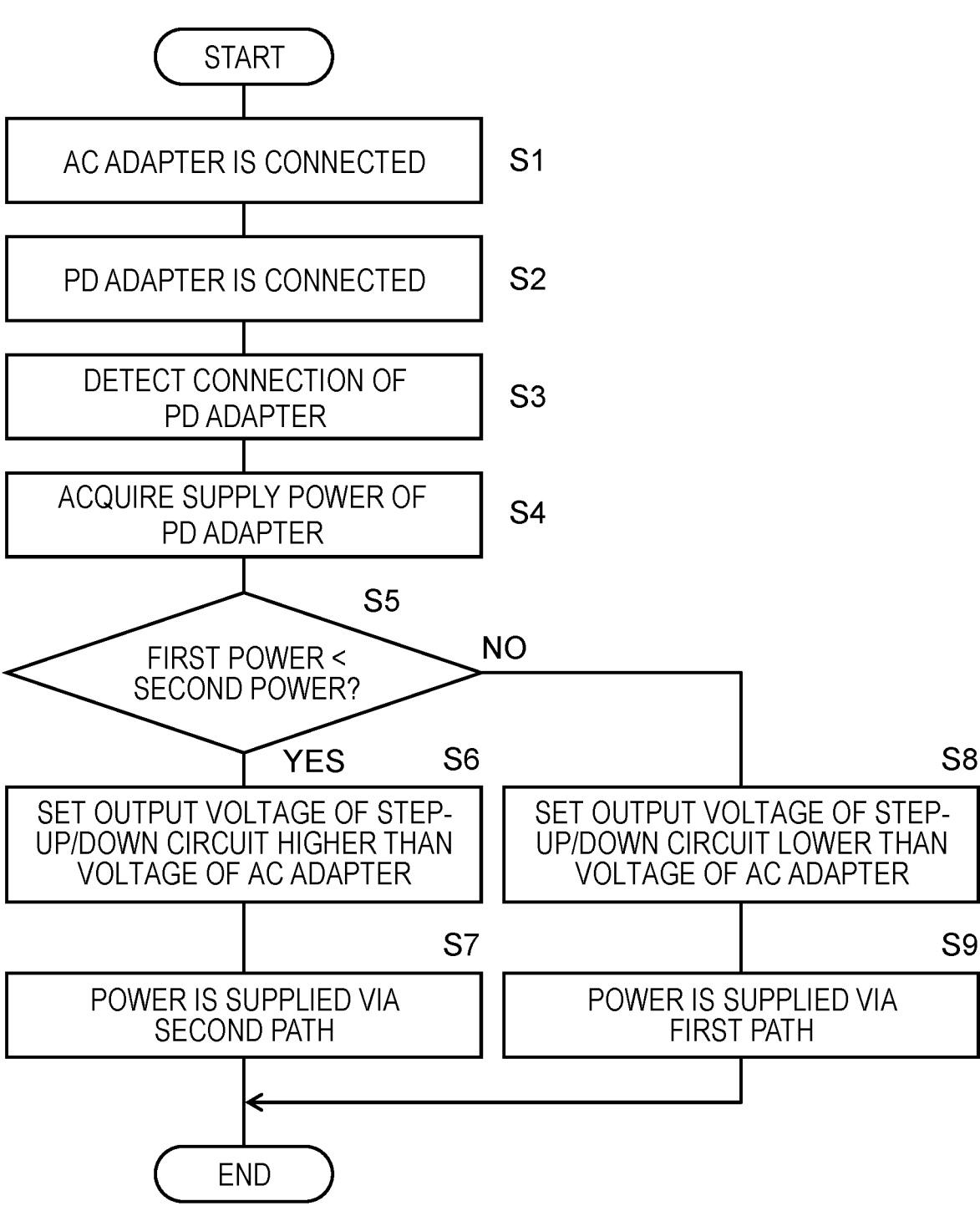
FIG. 3 is a flowchart for explaining power feed processing of the electronic device of FIG. 1.

As illustrated in FIG. 3, when the AC adapter is connected to first power feed port 50 (step S1) and the USB-PD adapter is connected to second power feed port 60 (e.g., third power feed port 61) (step S2), first control device 91 detects connection of the USB-PD adapter (step S3) and acquires supply power of the connected USB-PD adapter (step S4).

When the supply power of the USB-PD adapter is acquired, second control device 92 determines whether or not the supply power (=first power) of the AC adapter acquired in advance is smaller than the supply power (=second power) of the USB-PD adapter (step S5).

When it is determined that the first power is smaller than the second power (YES in step S5), second control device 92 causes step-up/down circuit 80 to set the output voltage of step-up/down circuit 80 to be higher than the voltage of the AC adapter (step S6). Due to this, first switching circuit 70 switches the power feed path to second path 120, the second power is supplied to power feed target 100 via second path 120 (step S7), and the power feed processing ends.

When it is determined that the first power is larger than the second power (or equal to the second power) (NO in step S5), second control device 92 causes step-up/down circuit 80 to set the output voltage of step-up/down circuit 80 to be lower than the voltage of the AC adapter (step S8). Due to this, first switching circuit 70 switches the power feed path to first path 110, the first power is supplied to power feed target 100 via first path 110 (step S9), and the power feed processing ends.

Next, power feed path switching processing when USB-PD adapters of different supply power are connected to third power feed port 61 and fourth power feed port 62, respectively, will be described.

Figure 4:
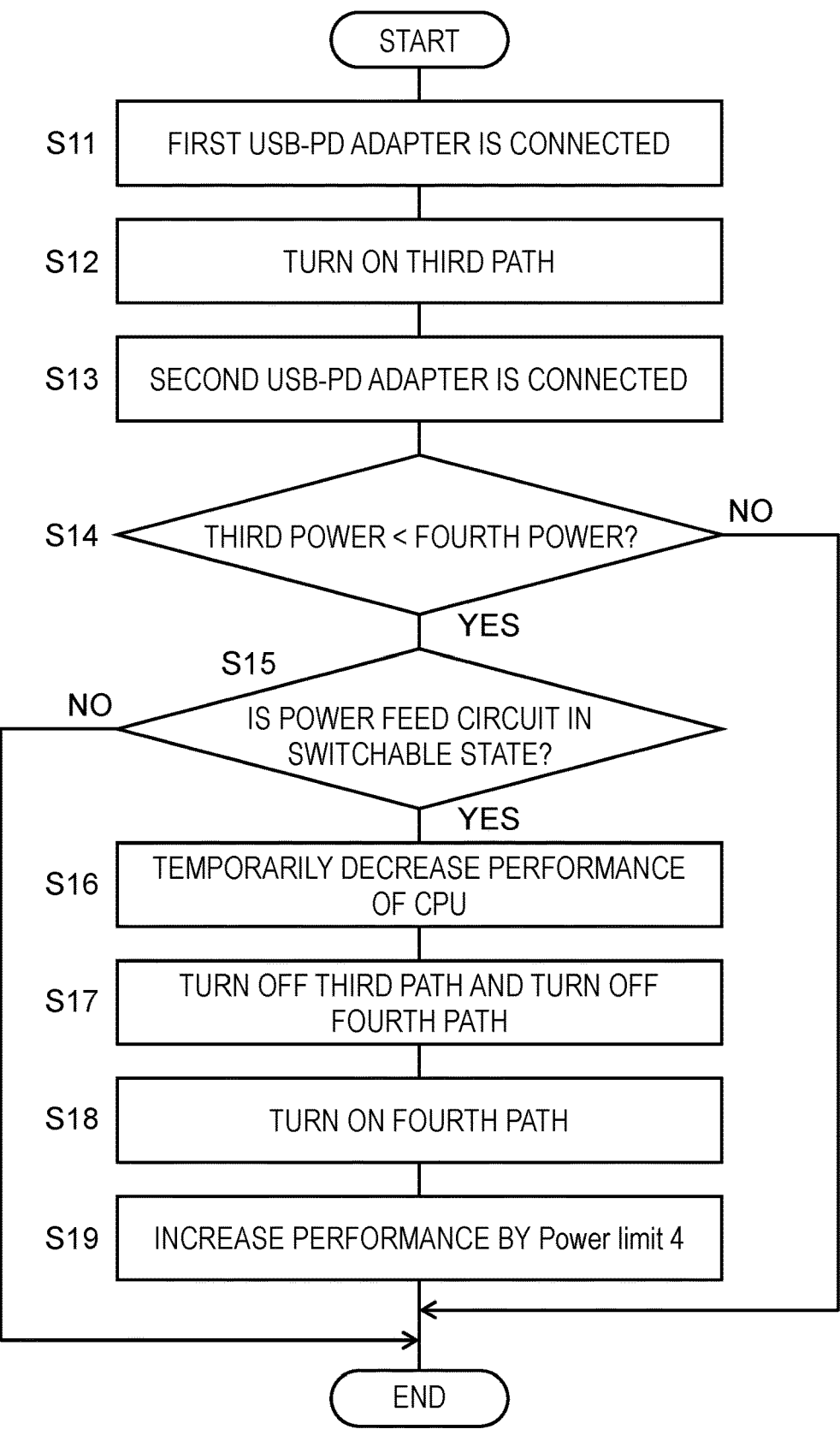
FIG. 4 is a flowchart for explaining power feed path switching processing of the electronic device of FIG. 1.

As illustrated in FIG. 4, when a first USB-PD adapter is connected to third power feed port 61 (step S11), second control device 92 causes second switching circuit 71 to turn on third path 130 (step S12). At this time, first control device 91 acquires supply power (=third power) of the first USB-PD adapter.

Thereafter, when the second USB-PD adapter is connected to fourth power feed port 62 (step S13), first control device 91 acquires supply power (=fourth power) of a second USB-PD adapter, and second control device 92 determines whether or not the fourth power is larger than the third power (step S14). When it is determined that the fourth power is smaller than the third power (or equal to the third power) (NO in step S14), the power feed path is not switched, and the power feed path switching processing ends.

When it is determined that the fourth power is larger than the third power (YES in step S14), second control device 92 determines whether or not the power feed path can be switched based on the state of power feed target 100 (step S15). When it is determined that the power feed path cannot be switched (NO in step S15), the switching of the power feed path is not performed, and the power feed path switching processing ends.

When it is determined that the power feed path can be switched (YES in step S15), second control device 92 temporarily reduces the performance of the CPU by Power limit 4 (step S16). Thereafter, second control device 92 causes second switching circuit 71 to turn off third path 130 and fourth path 140 (step S17), and then turns on fourth path 140 to switch the power feed path from third path 130 to fourth path 140 (step S18). When switching of the power feed path is performed, second control device 92 increases the performance of the CPU by Power limit 4 (step S19), and the power feed path switching processing ends.

Electronic device 1 can exhibit the following effects.

Electronic device 1 includes first power feed port 50 to which the first power supply adapter 51 is connected, second power feed port 60 to which the second power supply adapter 63 is connected, first switching circuit 70 that switches the power feed path between first path 110 and second path 120, the step-up/down circuit arranged between second power feed port 60 and first switching circuit 70 in second path 120, and the control device that controls the step-up/down circuit. First switching circuit 70 switches the power feed path to first path 110 when the voltage of first path 110 is higher than the voltage of second path 120, and switches the power feed path to second path 120 when the voltage of second path 120 is higher than the voltage of first path 110. Control device 90 compares the first power and the second power when the first power supply adapter 51 is connected to first power feed port 50 and the second power supply adapter 63 is connected to second power feed port 60. When the first power is larger than the second power, control device 90 causes step-up/down circuit 80 to make the voltage of the second power lower than the voltage of the first power. When the second power is larger than the first power, control device 90 causes step-up/down circuit 80 to make the voltage of the second power higher than the voltage of the first power. With such configuration, it is possible to achieve an electronic device capable of preventing a decrease in performance by more reliably performing switching to a power feed path having a large supply power when a plurality of power is simultaneously supplied via a plurality of power feed paths.

Electronic device 1 includes third power feed port 61 to which the third power supply adapter 64 is connected, fourth power feed port 62 to which the fourth power supply adapter 65 is connected, and second switching circuit 71 that switches the power feed path between third path 130 and fourth path 140. Control device 90 compares the third power and the fourth power when the third power supply adapter 64 is connected to third power feed port 61 and the fourth power supply adapter 65 is connected to fourth power feed port 62. When the third power is larger than the fourth power, control device 90 causes second switching circuit 71 to switch the power feed path to third path 130. In this case, third path 130 constitutes second path 120, and third power feed port 61 constitutes second power feed port 60. When the fourth power is larger than the third power, control device 90 causes second switching circuit 71 to switch the power feed path to fourth path 140. In this case, fourth path 140 constitutes second path 120, and fourth power feed port 62 constitutes second power feed port 60. With such configuration, it is possible to achieve an electronic device capable of preventing a decrease in performance by more reliably performing switching to a power feed path with large supply power even when a plurality of power is simultaneously supplied via three or more power feed paths.

With the recent improvement in performance of the CPU, the demand for rapid charging, and the like, the load on the system of electronic device 1 is increasing. When the power feed path is switched under a condition where the load on the system of electronic device 1 is large, there is a risk of occurrence of power discontinuity of electronic device 1 not intended by the user. In electronic device 1, when the third power supply adapter 64 is connected to third power feed port 61 and the fourth power supply adapter 65 is connected to fourth power feed port 62, control device 90 determines whether or not the power feed path can be switched by second switching circuit 71 based on the state of power feed target 100. With such configuration, for example, it is possible to avoid unintended power discontinuity of electronic device 1 that may occur when the power feed path is switched under a condition where the load on power feed target 100 is large.

Power feed target 100 includes a battery. Control device 90 determines whether or not the power feed path can be switched by second switching circuit 71 depending on the remaining amount of the battery. With such configuration, for example, it is possible to more reliably avoid unintended power discontinuity of electronic device 1 that may occur when the power feed path is switched under a condition where the load on power feed target 100 is large.

Power feed target 100 includes a processing device. Control device 90 causes second switching circuit 71 to switch the power feed path after the control device 90 temporarily decreases the performance of the processing device, when the control device 90 determines that the power feed path can be switched by the second switching circuit 71. With such configuration, for example, it is possible to more reliably avoid unintended power discontinuity of electronic device 1 that may occur when the power feed path is switched under a condition where the load on power feed target 100 is large.

When a USB-PD adapter is connected to a plurality of USB Type-C ports and switching is performed to one power feed path from among a plurality of power feed paths, in order to avoid a short circuit between the USB-PD adapters, it is necessary to provide a timing at which power feed is performed from neither the power feed path of a switching source nor the power feed path of a switching destination. In electronic device 1, after temporarily decreasing the performance of the processing device, before switching the power feed path, control device 90 causes second switching circuit 71 to turn off third path 130 and fourth path 140. With this configuration, it is possible to prevent a short circuit between the third power supply adapter 64 and the fourth power supply adapter 65 due to simultaneous turning-on of the plurality of power feed paths.

Electronic device 1 can also be configured as follows.

Second power feed port 60 is not limited to the case of including third power feed port 61 and fourth power feed port 62, and may include one power feed port or three or more power feed ports. For example, when second power feed port 60 includes one power feed port, second switching circuit 71 can be omitted. For example, it is assumed that second power feed port 60 includes three or more power feed ports, and the power supply adapters are connected to the three or more power feed ports. In this case, second control device 92 can be configured to compare the supply power of all the connected power supply adapters and to determine that the power supply adapter with the highest supply power is the second power supply adapter 63 and the power feed port connected to this power supply adapter is second power feed port 60.

The respective power feed port can be configured to be connectable to an arbitrary power supply adapter in accordance with the design of electronic device 1 or the like.

Power feed target 100 is only required to be a component or the like that requires power supply in electronic device 1.

Steps S16 to S19 of FIG. 4 can be omitted.

Control device 90 is not limited to the case of including first control device 91 and second control device 92, and may include one control device or may include three or more control devices. Each control device may include a communication module that connects the control devices in a wired or wireless manner.

Electronic device 1 may include a communication module that performs transmission and reception with an external device. For example, electronic device 1 may store information such as the standard of an AC adapter in an external device (e.g., a server) and acquire the information from the external device by communication as necessary.

A central processing unit (CPU), a volatile storage device (RAM), a nonvolatile storage device (ROM, SSD, or the like), a battery, and the like may be provided in first unit 10.

By appropriately combining discretionary exemplary embodiments or modifications among the various exemplary embodiments or modifications, it is possible to achieve the respective effects. Combination of exemplary embodiments, combination of examples, or combination of an exemplary embodiment and an example are possible, and combination of features in different exemplary embodiments or examples is also possible.

Although the present disclosure has been described in connection with a preferable exemplary embodiment with reference to the accompanying drawings, various variations and modifications are obvious to those skilled in the art. Such variations and modifications are to be understood as being included within the scope of the present disclosure as set forth in the appended scope of claims unless departing from the scope of the present disclosure.

The present disclosure is widely applicable to electronic devices including laptop personal computers.

What is claimed is:

1. An electronic device comprising:
a first power feed port to which a first power supply adapter is connected;
a second power feed port to which a second power supply adapter is connected;
a first switching circuit that switches a power feed path between a first path that is connected to the first power feed port and supplies first power to a power feed target and a second path that is connected to the second power feed port and supplies second power to the power feed target;
a step-up/down circuit that is arranged between the second power feed port and the first switching circuit in the second path and raises or lowers a voltage of the second power; and
a control device that controls the step-up/down circuit, wherein
the first switching circuit switches the power feed path to the first path when a voltage of the first path is higher than a voltage of the second path, and switches the power feed path to the second path when a voltage of the second path is higher than a voltage of the first path, and
the control device
compares the first power and the second power when the first power supply adapter is connected to the first power feed port and the second power supply adapter is connected to the second power feed port,
causes the step-up/down circuit to make the voltage of the second power lower than the voltage of the first power when the first power is larger than the second power, and
causes the step-up/down circuit to make the voltage of the second power higher than the voltage of the first power when the second power is larger than the first power.

2. The electronic device according to claim 1, further comprising a second switching circuit,
wherein
the second power supply adapter includes a third power supply adapter and a fourth power supply adapter,
the second power feed port includes a third power feed port to which the third power supply adapter is connected and a fourth power feed port to which the fourth power supply adapter is connected,
the second path includes a third path that is connected to the third power feed port and supplies third power to the power feed target and a fourth path that is connected to the fourth power feed port and supplies fourth power to the power feed target,
the second switching circuit switches the power feed path between the third path and the fourth path, and
the control device
compares the third power and the fourth power when the third power supply adapter is connected to the third power feed port and the fourth power supply adapter is connected to the fourth power feed port,
causes the second switching circuit to switch the power feed path to the third path and the third path to constitute the second path, when the third power is larger than the fourth power, and
causes the second switching circuit to switch the power feed path to the fourth path and the fourth path to constitute the second path, when the fourth power is larger than the third power.

3. The electronic device according to claim 2, wherein the control device determines whether or not the power feed path can be switched by the second switching circuit based on a state of the power feed target when the third power supply adapter is connected to the third power feed port and the fourth power supply adapter is connected to the fourth power feed port.

4. The electronic device according to claim 3, wherein
the power feed target includes a battery, and
the control device determines whether or not the power feed path can be
switched by the second switching circuit depending on a remaining amount of the battery.

5. The electronic device according to claim 3, wherein
the power feed target includes a processing device, and
the control device causes the second switching circuit to switch the power feed path after the control device temporarily decreases a performance of the processing device, when the control device determines that the power feed path can be switched by the second switching circuit.

6. The electronic device according to claim 5, wherein after temporarily decreasing performance of the processing device, before switching the power feed path, the control device causes the second switching circuit to turn off the third path and the fourth path.

7. The electronic device according to claim 2, wherein the control device includes
a first control device that acquires information on the third power and the fourth power from the third power feed port and the fourth power feed port, and
a second control device that controls the step-up/down circuit and controls the second switching circuit based on the information acquired by the first control device.

* * * * *